United States Patent
Pendse

(10) Patent No.: US 10,243,983 B2
(45) Date of Patent: Mar. 26, 2019

(54) SYSTEM AND METHOD FOR USING SIMULATORS IN NETWORK SECURITY AND USEFUL IN IOT SECURITY

(71) Applicant: Sudhir Pendse, Los Altos, CA (US)

(72) Inventor: Sudhir Pendse, Los Altos, CA (US)

( * ) Notice: Subject to any disclaimer, the term of this patent is extended or adjusted under 35 U.S.C. 154(b) by 195 days.

(21) Appl. No.: 15/346,940

(22) Filed: Nov. 9, 2016

(65) Prior Publication Data

US 2017/0163671 A1     Jun. 8, 2017

Related U.S. Application Data

(60) Provisional application No. 62/264,785, filed on Dec. 8, 2015.

(51) Int. Cl.
    *H04L 29/06*     (2006.01)

(52) U.S. Cl.
    CPC ...... *H04L 63/1425* (2013.01); *H04L 63/1441* (2013.01)

(58) Field of Classification Search
    CPC ................ H04L 63/1425; H04L 63/1441
    See application file for complete search history.

(56) References Cited

U.S. PATENT DOCUMENTS

| | | | |
|---|---|---|---|
| 8,112,800 B1* | 2/2012 | Yang | G06F 21/554 726/22 |
| 2005/0086522 A1* | 4/2005 | Rowland | H04L 63/1408 726/4 |
| 2010/0266215 A1* | 10/2010 | Hua | G06K 9/62 382/229 |
| 2010/0281539 A1* | 11/2010 | Burns | H04L 63/1441 726/23 |
| 2011/0055921 A1* | 3/2011 | Narayanaswamy | H04L 63/1458 726/22 |

* cited by examiner

*Primary Examiner* — Khoi V Le

(57) ABSTRACT

The invention provides a system and method for detecting intrusion is an intranet, determining of attack intent; identifying compromised servers and network elements; creating request log; and outputting alerts to users by a predetermined alert medium. The invention provides encoding of received requests such that compromised network elements can be identified.

4 Claims, 11 Drawing Sheets

SYSTEM AND METHOD FOR USING SIMULATORS IN NETWORK SECURITY AND USEFUL IN IOT SECURITY

GOVERNMENT FUNDING

None.

FIELD OF USE

The invention is useful in the field of computer security, and more specifically, computer intranet security.

RELATED CASES

This application is related to and claim priority from U.S. provisional application No. 62/264,785, of the same title and by the same inventor, filed Dec. 8, 2015, the entirety of which is incorporated by reference as if fully set forth herein.

BACKGROUND

Networks are made up of different elements like cloud servers, load balancers, routers, switches, wireless access points, personal computers, and mobile devices. These networks are being extended to also include sensors and gateways as "Internet of Things" (IoT) becomes a reality.

Network elements typically include a functional component that provides the functionality of the element and a management component that provides access to the information within the functional component of the network element. Management applications that monitor and control network elements, interact with the management component within the network elements to carry out their tasks by sending management requests over the network.

As more and more things connect to the network, their security becomes even more important. Network security is focused on blocking intrusions to the network and allowing access to network elements to only those with the right credentials. However in spite of the best efforts to prevent network intrusion, networks continue to get attacked and compromised. Network elements and sensors that can include power grids transformers, medical equipment in hospitals and routers within the networking infrastructure are all susceptible to malicious attacks.

Since some IoT sensors are small and without much computing power, they do not have much security built-in and rely on physical proximity to connect with secure gateways that are within a trusted network. When the trusted network/gateway is breached, the sensors become particularly vulnerable. Compromised networks do not even realize that they have been compromised.

What is needed is a means of detecting intrusion, identifying compromised network resources, and notifying network administrators without risking damage to network elements or sensors.

BRIEF SUMMARY OF THE INVENTION

This invention provides a setup and operation of management component simulators that are interspersed within a real network along with real network elements and sensors to enhance network security. Management component simulators can detect when an intrusion has occurred, detect which resource has been compromised, detect what the attackers are doing, and silently raise an alarm to notify network system administrators, without risking damage to real network elements and sensors. In one embodiment an alarm is raised by sending SNMP trap or syslog type events to standard or special ports; alternate embodiments include making entries in special log files, or communicating alerts to system administrators via display, text messages or other preselected mediums.

The invention provides use of management component simulators, which in turn provides a mixture of targets, some real some simulated, to hacker scripts that have successfully compromised network security. When management component simulators are accessed the management component simulators quickly identify attacks and safeguard valuable resources by a) detecting that intrusion has occurred, b) determining the intent of the attack without putting real resources at risk c) identifying compromised internal resource such as servers and network elements, and d) logging all requests for subsequent forensics.

In the preferred embodiment, the system includes a network management system, a plurality of network elements, where said elements include real and simulated targets, a management component, said management component including a management component simulator, a data/modeling file, and providing management component simulator which, in the instance where hacker scripts have infiltrated either of the network management system and a network element to which the management component simulator is connected, a method for generating a unique fingerprint for each received request, said method comprising the steps of :a) examining a request, where said examining includes identifying protocol and decoding request; b) creating a request fingerprint based on examination of said request, where said request fingerprint uniquely tags and characterizes said request; c) encoding said request fingerprint into said request.

In the preferred embodiment, the request fingerprint, time of request and request frequency are recorded in a request fingerprint white list.

BRIEF DESCRIPTION OF THE DRAWINGS

The following drawings are provided as an aid to understanding the invention.

DETAILED DESCRIPTION OF A PREFERRED EMBODIMENT OF THE INVENTION

Management Component Simulators. Management component simulators can be thought of as data driven software tools that respond to incoming management requests based on the contents of the data/modeling file associated with them. The data/modeling file used to drive the simulator can be learnt from real devices and sensors using a management component learner program. The learner program makes similar requests like a real management application or can look at captured packets containing interaction between a management application and a real device from the wire, or from a Proxy Forwarder application, to generate the Data/Modeling files.

Figure 1:
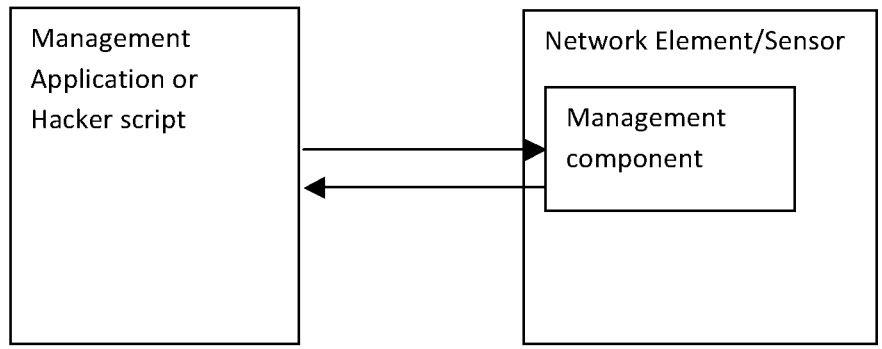
FIG. 1 depicts the normal interaction between a management application or a hacker script and a real network element/sensor. (prior art)

Creating Data/Modeling files to seed simulation. Referring to FIG. 1 through FIG. 4, the figures describe the process of recording and creating data/modeling files that assist in duplicating real network element/sensor behavior. FIG. 1 describes the normal interaction between a management application or a hacker script and a real network element/sensor.

Figure 2A:
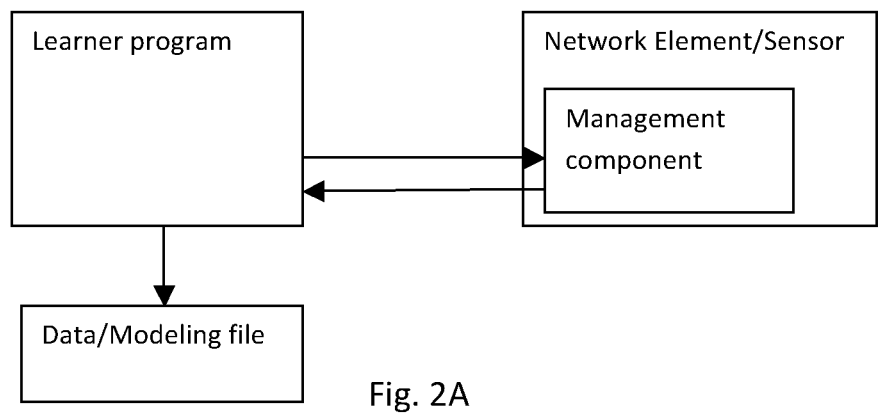
FIG. 2A depicts the recording of information by a learner program as it sends similar requests to the real network element/sensor. (prior art)

FIG. 2(a) describes the recording of information by a learner program as it sends similar requests to the real network element/sensor.

Figure 2B:
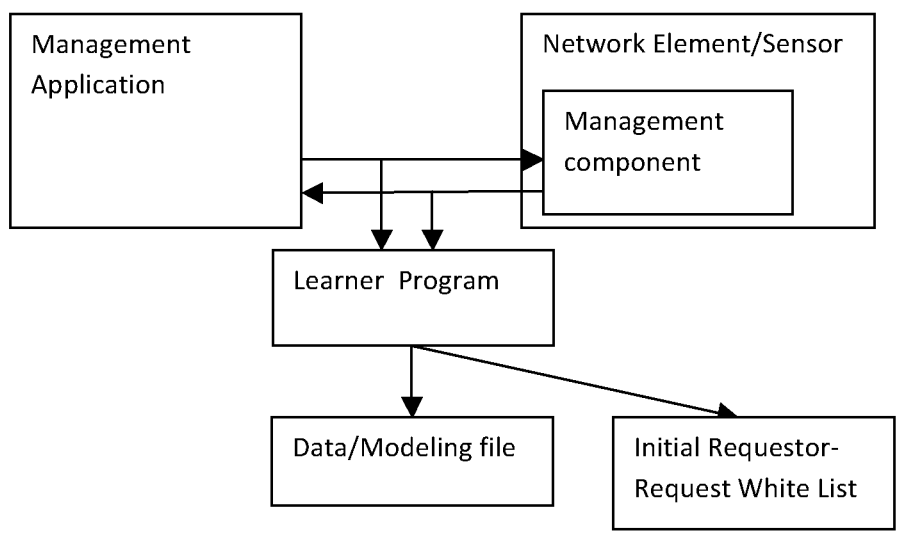
FIG. 2B depicts the recording of information by examining packets of normal interaction between a management application and a real device to create simulation Data/Modeling files as well as initial requestor-request white lists

FIG. 2(b) describes the recording of information by examining packets of normal interaction between a management application and a real device to create simulation Data/Modeling files as well as initial requestor-request white lists.

Figure 2C:
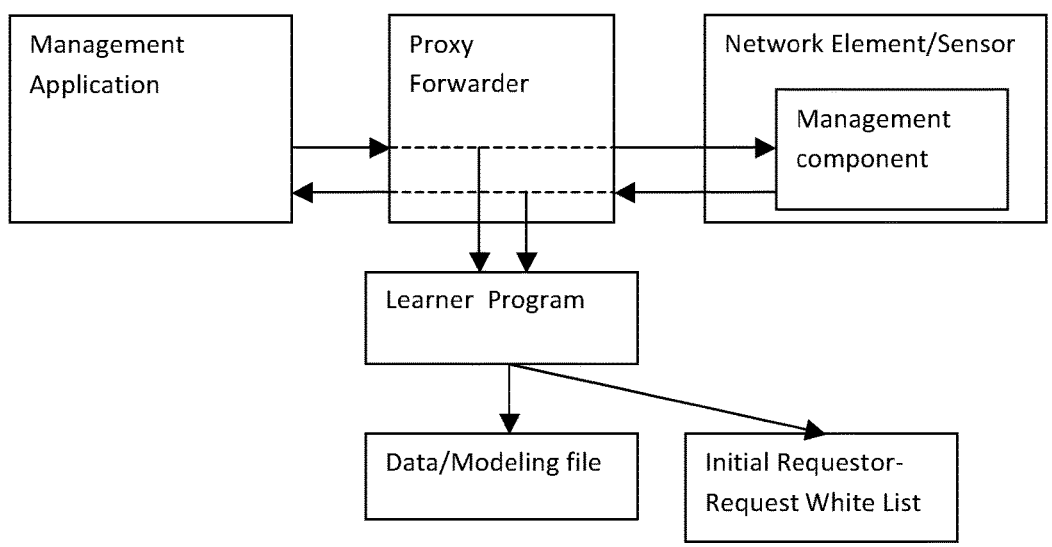
FIG. 2C depicts the recoding of information by using a Proxy Forwarder application that sits between a management application and a real device and captures requests/responses between them to create simulation Data/Modeling files as well as initial requestor-request white lists

FIG. 2(c): describes the recording of information by a Proxy forwarder which sits in the middle between a Management Application and a real device and using the recorded packet exchange for the creation of the simulation Data/Modeling file as well as initial requestor-request white lists.

Figure 3:
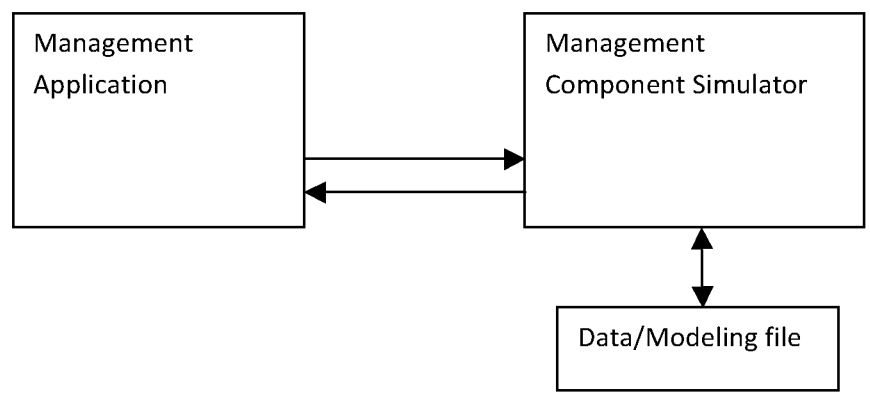
FIG. 3 depicts management simulators pretending to be real network elements by sending similar responses to requests from management applications based on learnt Data/Modeling file information. (prior art)

Management Component Simulator. Management component simulator is a software tool that simulates one or more network element/sensor. It is a software tool that runs on a computer and listens to requests on a particular interface or IP address. In FIG. 3, it listens for requests on the management protocol specific port, parses the protocol specific request, and looks up the information from the associated Data/Modeling file and based on that information, it generates a response to the received request. In case where possible, it can also simulate multiple network element/sensors on a single computer as shown in FIG. 4 by defining multiple interfaces/IP addresses to the same computer.

Referring now to FIG. 3, FIG. 3 describes management simulators pretending to be real network elements by sending similar responses to requests from management applications based on learnt Data/Modeling file information.

Figure 4:
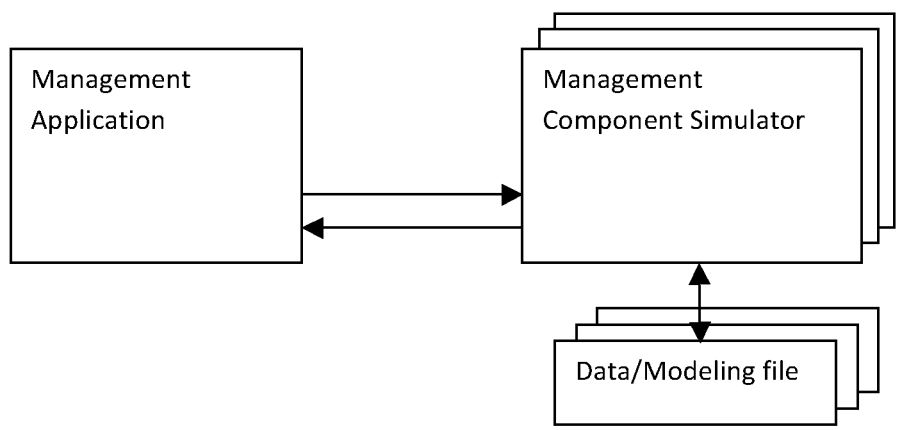
FIG. 4 depicts management simulator pretending to be many real network elements. (prior art)

Referring now to FIG. 4, FIG. 4 describes management simulator pretending to be one or many real network elements.

Simulators Interspersed With Real Network Components. As depicted in FIG. 4, multiple management component simulators can run on one computer by doing multi-homed IP and adding multiple IP addresses to the underlying stack or can run on separate computers. Such management component simulators can appear to be interspersed with real network components on the network to act as device "honey pots".

In the case of sensors, sensors will respond to multicast queries and get "discovered" by hacker scripts that scan networks. However sensors do not provide any real functionality as the functional component is missing in them. For routers, a dummy route can be added to a routers routing table to make it appear as if there is another connected sub-network that can be discovered.

Figure 5:
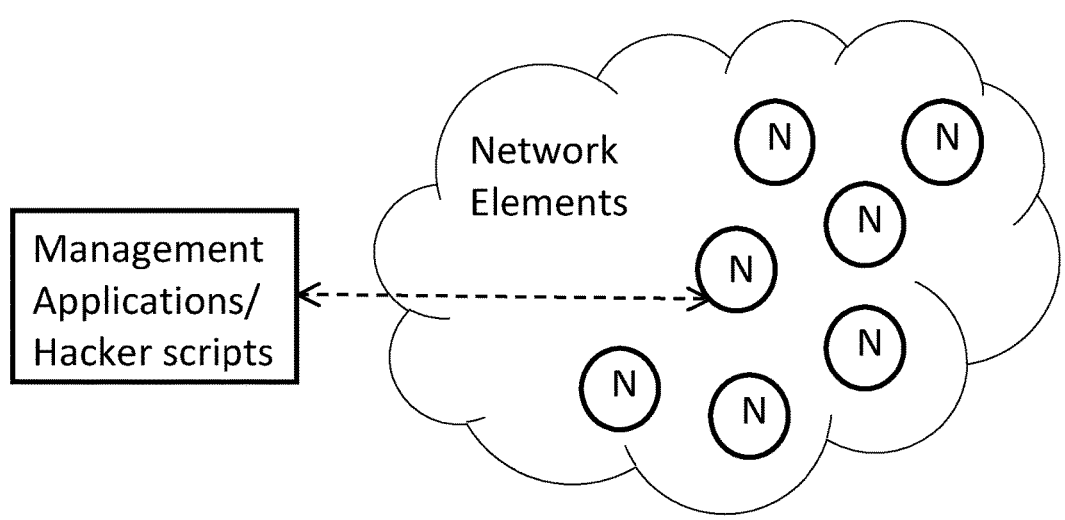
FIG. 5 depicts a real network made up of network elements/sensors interacting with a management application or hacker script. (prior art)

Referring now to FIG. 5, FIG. 5 shows a real network made up of network elements/sensors interacting with a management application or hacker script.

Figure 6:
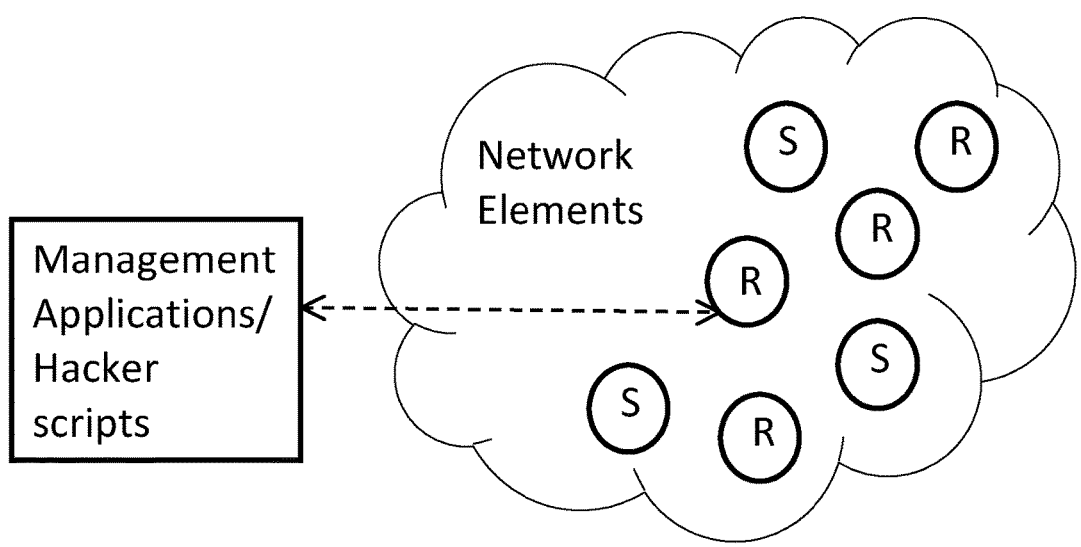
FIG. 6 depicts a real network made up of interspersed elements, with some real and some simulated according to an embodiment of the invention.

Referring to FIG. 6, FIG. 6: shows a real network made up of interspersed elements, with some real and some simulated.

Figure 7:
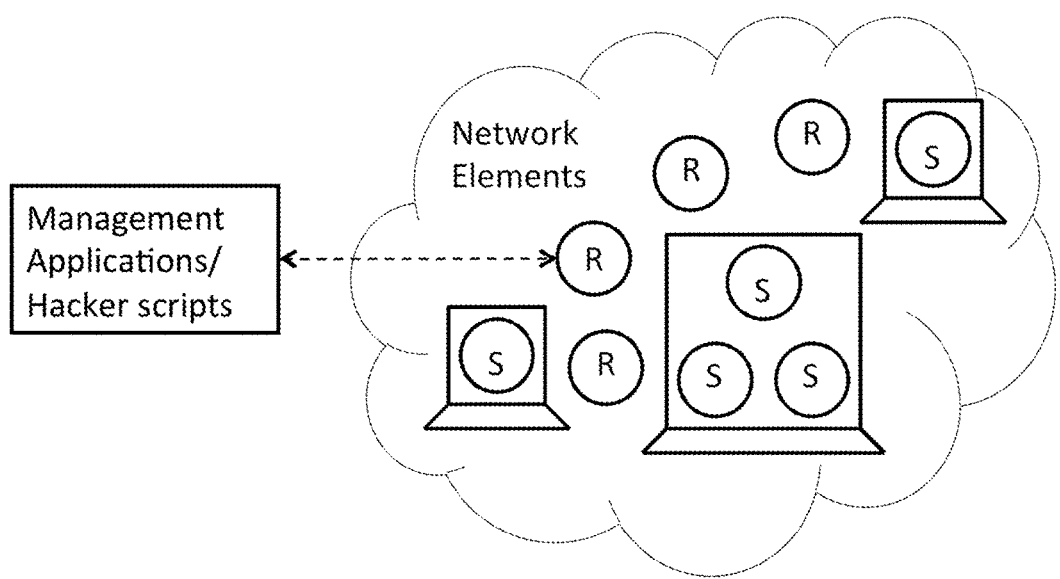
FIG. 7 depicts a real network made up of interspersed elements, with some real and some simulated, where the simulated elements run on one or more computers, according to an embodiment of the invention.

Referring now to FIG. 7, FIG. 7 shows a real network made up of interspersed elements, with some real and some simulated, where the simulated elements run on one or more computers.

Figure 8:
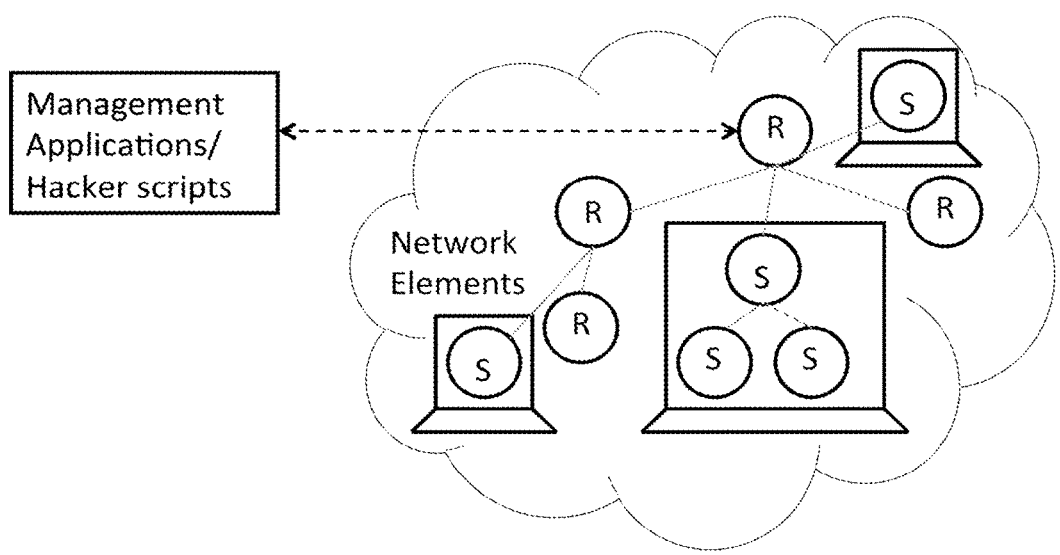
FIG. 8 depicts a real network, according to an embodiment of the invention, made up of interconnected network elements such as routers and switches where some of network elements are real and some simulated.

Referring now to FIG. 8, FIG. 8 shows a real network made up of interconnected network elements like routers and switches where some of network elements are real and some simulated.

Detecting Intrusions. When a network is intruded and hacker scripts are resident on trusted resources inside the network, they will scan the network to determine the network elements present. During this scanning they will discover both real and simulated network elements but since the responses from the simulated elements are similar to real elements, they will not be able to differentiate between them.

Simulated elements will keep track of who is sending it requests and what is being requested. A simulated element will always log the requests being made to it. A simulated element also examines the request and determines a request fingerprint based on the type of the encoding, the underlying packet characteristics, the order of the requested information, and any additional parameters specified. It keeps track of two types of white lists, a white list of legitimate requestors and associated with each legitimate requestor, a white list of request fingerprints, time, and frequency of requests. If the simulated element detects a request from someone not on its white list of requestors, then it will still respond to the request but silently raise an alarm.

If a trusted requestor's security is breached and the hacker script is made to run on it, the hacker request might come from the white list of requestors. In this case while the requestor might pass the requestor white list, its requests are checked against the request fingerprints white list to see if the fingerprint of request, the time of request or the frequency of request matches legitimate requests made previously and present in the white list. The request fingerprint whitelist contains all the details of requests including request type, order of parameters, style of encoding of request, time of requests, and frequency of requests. If it does not match, then it will also raise an alarm. This will also help in identifying that the trusted requestor's security has been breached. The log of the requests made will help with the forensics in determining what the hacker script is trying to do. When the management component simulators are initially deployed, the white lists will be empty unless previously configured using captured packet exchanges or proxy forwarder output. The simulator can also be configured to automatically add request fingerprints to its white list during an initial configurable learning phase so as to minimize the alarms. In addition the white list can be manually edited to add legitimate requestors and legitimate requestors and requests after they have been processed to minimize alarms in the future.

Figure 9:
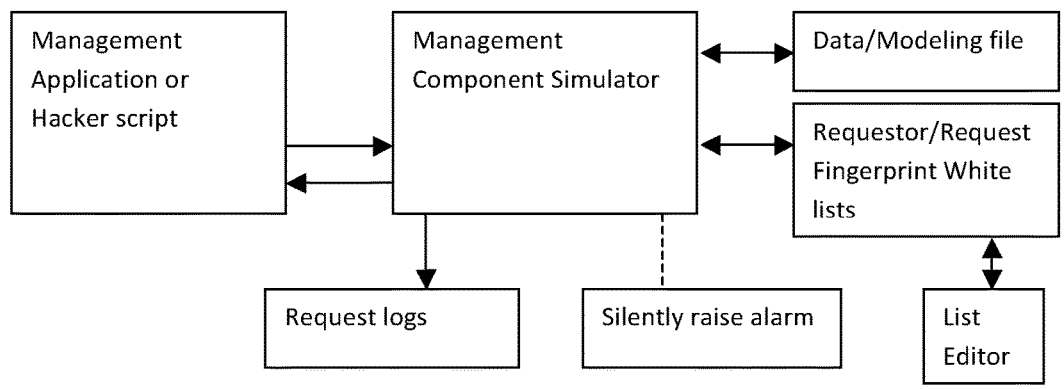
FIG. 9 describes management simulators that log requests, look at requestor and request white lists and silently raise alarm when an anomaly is detected according to an embodiment of the invention.

Referring now to FIG. 9, FIG. 9 describes management simulators that log requests, look at requestor and request white lists and silently raise alarm when an anomaly is detected.

Figure 10:
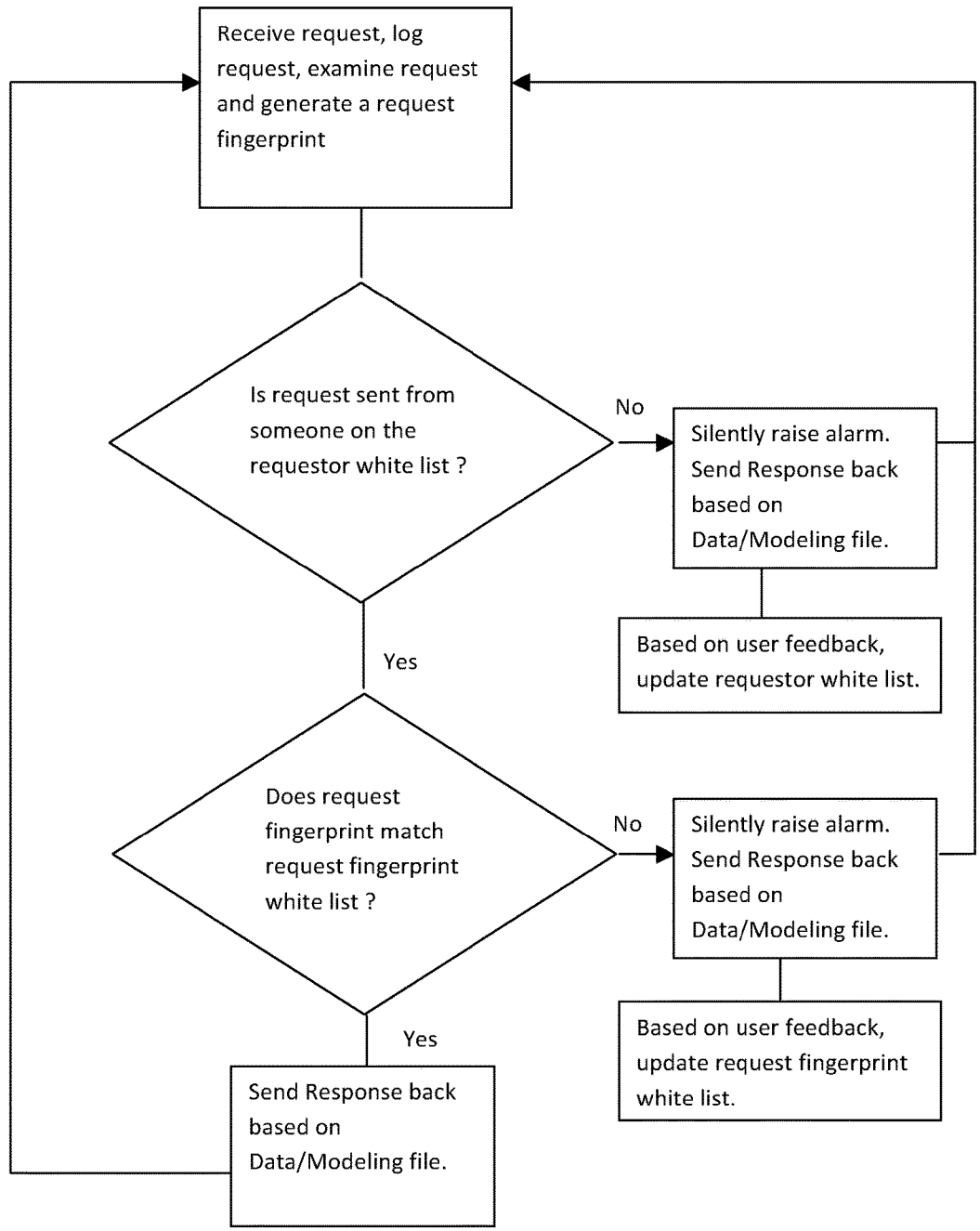
FIG. 10 is a flow chart of the processing depicted in FIG. 9.

Referring now to FIG. 10, FIG. 10 is a flow chart of the process depicted in FIG. 9. The method according to the invention comprises the steps of:

a) receiving requests;
b) logging requests;
c) examining requests and generating request fingerprints;
d) determining if request is from a white list requestor; if no, go to step h);
e) if step d is yes, determining whether request fingerprint matches fingerprint white list;
f) if step e is yes, sending response based on data/modeling file;
g) if step e is no, raising silent alarm, sending response based on data modeling; file, and, based on feedback, updating request fingerprint whitelist; and
h) if step d is no, raising silent alarm, sending response based on data/modeling file, and, based on user feedback, updating requestor whitelist.

Management Request Fingerprinting. Management application requests that communicate with the management component within network elements and sensors get encoded into certain packet formats based on the management protocol used. The encoding rules within a management protocol support multiple encoding styles that are considered to be valid. Similar requests can thus get encoded into slightly different but valid encodings based on the underlying protocol library used. The management requests can also be broken up into varying number of packets when using connection oriented protocols like TCP. Some protocols such as HTTP include optional header fields. All of this underlying information, in addition to the request parameters themselves, is examined to determine the request fingerprint.

The computation of the request fingerprint depends on the request management protocol. For instance, in the case of SNMP packets, the way in the which the request is encoded such as the ASN.1 BER encoding style of encoding the length field (short or long), the type of requests, the order of the variable bindings and the variable binding themselves can all be used to determine the fingerprint. Request components like message id, which can be different in each request, are ignored in computing the fingerprint. In the case of Telnet, for example, the initial session negotiation commands, the number of packets used to send the command buffer along with the contents of the command buffer can be looked at when determining the request fingerprint rather than just the command buffer.

White Lists. A list of legitimate requestors is maintained. For each legitimate requestor, a list of sessions containing a list of request fingerprint along with the time between requests, is used to make entries in the request fingerprint white list Request Log Files. Since all requests are logged, the log files provide forensic information on the timing, type and originator of requests. These log files can also be post-processed to see if there was something missed during intrusion detection and catch requests being made at more holistic multi-device level.

As described hereinabove, the invention uses management component simulators, and provides a mixture of real and simulated targets to hacker scripts that have successfully compromised network security. When management component simulators are accessed by hacker scripts they can help to quickly stop attacks and safeguard valuable resources by detecting that intrusion has occurred; determining the intent of the attack without putting real resources at risk; identifying compromised internal resources like servers and network elements; creating logs of all requests; outputting and communicating alerts to personnel, via display, text, or other preselected alert medium.

A specific example of the invention is now described.

In what can be described as "an intelligent honeypot for intrusion detection", a SimpleNetDecoy provides an easy to use, software based device simulator that appears on a network like any other device. Such an embodiment supports many if not all of common network management and IoT protocols, including SNMP, Telnet, SSH, HTTP/s, IPMMI, TL1, vSphere APIs, MQTT, CoAP, Modbus, BACnet. According to the invention, a "decoy" learns from existing devices to duplicate such devices and then run inside an intranet or computer/VMs with unused IPs, creating a mixture of real and simulated devices.

Then, the inventive decoy device listens to incoming requests, and responds to each request in an appropriate manner, based on learned data, and logs the interaction. The inventive decoy device also flags intrusions when it receives requests from unknown entities, or when requests differ from expected requests.

The invention also provide a "white list" of known entities and requests, automatically populated by accepting requests during a specific interval or populated manually or previously learnt from examining captured packets or proxy forwarder output.

The invention provides for unique fingerprinting of requests, which enables distinguishing requests from known entities which have been compromised.

Both IPv4 and IPv6 protocols are supported, and the invention runs on physical machines and virtual machines. Current system requires 64 bit Unix OS.

The invention adds additional security tool for intrusion detection within an intranet. Hackers infiltrating an intranet typically scan a network to discover devices attached to it. The inventive device shows up alongside real devices, and appears to be a real device. The inventive device responds back to queries, silently keeps a log of requests, and raises an alarm to identify compromised servers used to send the requests. The logs are useful in forensic analysis, analyzing intruder modes of operation, while not risking any real resources at risk. Intrusion alerts are forwarded, for example, to the main network management system (NMS) in the form of SNMP Traps and syslog messages. The logs are useful in training machine learning algorithms for intrusion detection.

What is claimed is:

1. A system comprises:
a network management system;
a plurality of network elements;

wherein the network elements include at least one real target and at least one simulated target, the simulated target including a central processing unit, memory and a management component, the management component including a management component simulator, a data or modeling file, the data or modeling file based on responses from the real target, the simulated target responding to intruder requests where intruders have infiltrated the network management system or any of the network elements to which the simulated target is connected, and where the simulated target continues to interact with infiltrated network elements as the real target, and wherein the central processing unit coupled with the memory, when executed by the system, perform the instructions of:

detecting the intruder requests on the simulated target;

determining requestor and request fingerprint for each intruder request;

examining each intruder request, wherein the examining includes identifying the requestor, protocol and decoding the intruder request;

determining an attack intent creating a request fingerprint based on examination of the intruder request, where the request fingerprint uniquely tags and characterizes the intruder request;

encoding the request fingerprint;

comparing the requestor and the request fingerprint with entries in a requestor and request fingerprint white list;

identifying network element sending request as infiltrated when the requestor and the request fingerprint do not match entries in the requestor and request fingerprint white list;

creating by means of the simulated target a log of the communication with the infiltrated network element; and outputting alerts to the network management system to indicate that the intruder requests from the infiltrated network element received, and an intrusion occurred.

2. The system of claim 1, wherein the request fingerprint, time of request, and request frequency are recorded in the request fingerprint white list.

3. A method comprises:

a simulated target management component simulators for detecting hacker activity indicative of intrusion on either of a network element and a network management system, the network element includes at least one real target and at least one simulated target, the simulated target including a central processing unit, memory and a management component, the management component including a management component simulator, a data or modeling file, the data or modeling file based on responses from the real target, the simulated target responding to intruder requests where intruders have infiltrated either the network management system or the network element to which the simulated target is connected, and where the simulated target continues to interact with infiltrated network elements as the real target, the method comprising the steps of:

receiving the intruder requests;

logging the intruder requests;

examining the intruder requests and generating request fingerprints, wherein generating the request fingerprints comprises:
  examining each intruder request,
  creating a request fingerprint based on examination of the intruder request, where the intruder request fingerprint uniquely tags and characterizes the intruder request, and
  encoding the request fingerprint from the intruder request;

determining if the intruder request is from a white list requestor;

when the request is not from the white list requestor:
  raising silent alarm, sending response based on data or modeling file, and
  updating the white list requestor based on user feedback;

determining whether the request fingerprint matches fingerprint white list when the request is from the white list requestor;

sending response based on data or modeling file when request fingerprint matches the fingerprint white list; and when the request fingerprint does not matches the fingerprint white list:
  raising silent alarm, sending response based on data or modeling file, and
  updating requestor whitelist based on user feedback.

4. The method of claim 3, wherein the request fingerprint, time of request, and request frequency are recorded in the request fingerprint white list.

* * * * *